UNITED STATES PATENT OFFICE.

SAMUEL O. BENTLEY, OF CANTON, OHIO, ASSIGNOR TO HIMSELF AND J. C. KELLY, OF SAME PLACE.

IMPROVEMENT IN CHEMICAL COMPOUNDS FOR DESTROYING NICOTINE IN TOBACCO.

Specification forming part of Letters Patent No. 127,215, dated May 28, 1872.

Specification describing a new and useful Improvement in Chemical Compound, invented by SAMUEL O. BENTLEY, of Canton, in the county of Stark and State of Ohio.

My invention has for its object to furnish an improved chemical compound for destroying the nicotine in cigars and smoking-tobacco so as to make them non-poisonous, and at the same time improve them by making them mild and pleasant; and it consists in the compound prepared of the ingredients and in about the proportions hereinafter set forth.

In preparing this compound, take tannic acid, one ounce; granulated nitrate of potash, one dram; powdered English valerian-root, one dram; powdered nutmeg, one dram.

These ingredients are thoroughly mixed, and to the mixture is added half a pint of pure water or sufficient water to case one hundred cigars.

This mixture is designed to be sprinkled upon the tobacco.

Having thus described my invention, I claim as new and desire to secure by Letters Patent—

The chemical compound prepared of the ingredients and in about the proportions and manner substantially as herein set forth and described.

SAMUEL OLIVER BENTLEY.

Witnesses:
   JNO. A. MACK,
   F. BLUM, Jr.